United States Patent [19]

Burba

[11] Patent Number: 4,887,848
[45] Date of Patent: Dec. 19, 1989

[54] REPLACEABLE PIPE LINER ASSEMBLY

[75] Inventor: Phillip E. Burba, Kirkwood, Mo.

[73] Assignee: Dynasauer Corporation, St. Louis, Mo.

[21] Appl. No.: 264,767

[22] Filed: Oct. 31, 1988

[51] Int. Cl.⁴ ............................................. F16L 41/00
[52] U.S. Cl. ..................................... 285/55; 285/156; 29/450
[58] Field of Search ................... 285/55, 156, 16, 260; 29/450

[56] References Cited

U.S. PATENT DOCUMENTS

| 785,176 | 3/1905 | Mommertz | 285/16 X |
|---|---|---|---|
| 1,964,123 | 6/1934 | Kaiser | 285/55 X |
| 2,088,922 | 8/1937 | Porteous | 285/55 |
| 2,366,067 | 12/1944 | Smith | 285/260 X |
| 2,366,814 | 1/1945 | Smith | 285/55 X |
| 3,148,896 | 9/1964 | Chu | 285/55 |
| 3,347,568 | 10/1967 | Weeden, Jr. et al. | 285/55 |
| 3,773,593 | 11/1973 | Casadevall et al. | 285/156 X |
| 4,733,889 | 3/1988 | Haines | 285/55 X |

FOREIGN PATENT DOCUMENTS

| 1164816 | 4/1984 | Canada | 285/55 |
|---|---|---|---|
| 322834 | 12/1929 | United Kingdom | 285/55 |

Primary Examiner—Thomas F. Callaghan
Attorney, Agent, or Firm—Rogers, Howell & Haferkamp

[57] ABSTRACT

A replaceable pipe liner assembly for a pipe assembly used to dispense abrasive materials has a plurality of tubular liner sections positioned in end-to-end engagement along the length of straight pipe sections of the pipe assembly, and further includes T-shaped liner sections for lining T fittings of the pipe assembly. The tubular liner sections and T-shaped liner sections are easily replaceable, and each is of molded, one-piece, construction, and of resilient abrasive resistant material such as polyurethane. The tubular liner sections interfit in end-to-end engagement to axially align the sections and present a smooth inner liner wall.

15 Claims, 2 Drawing Sheets

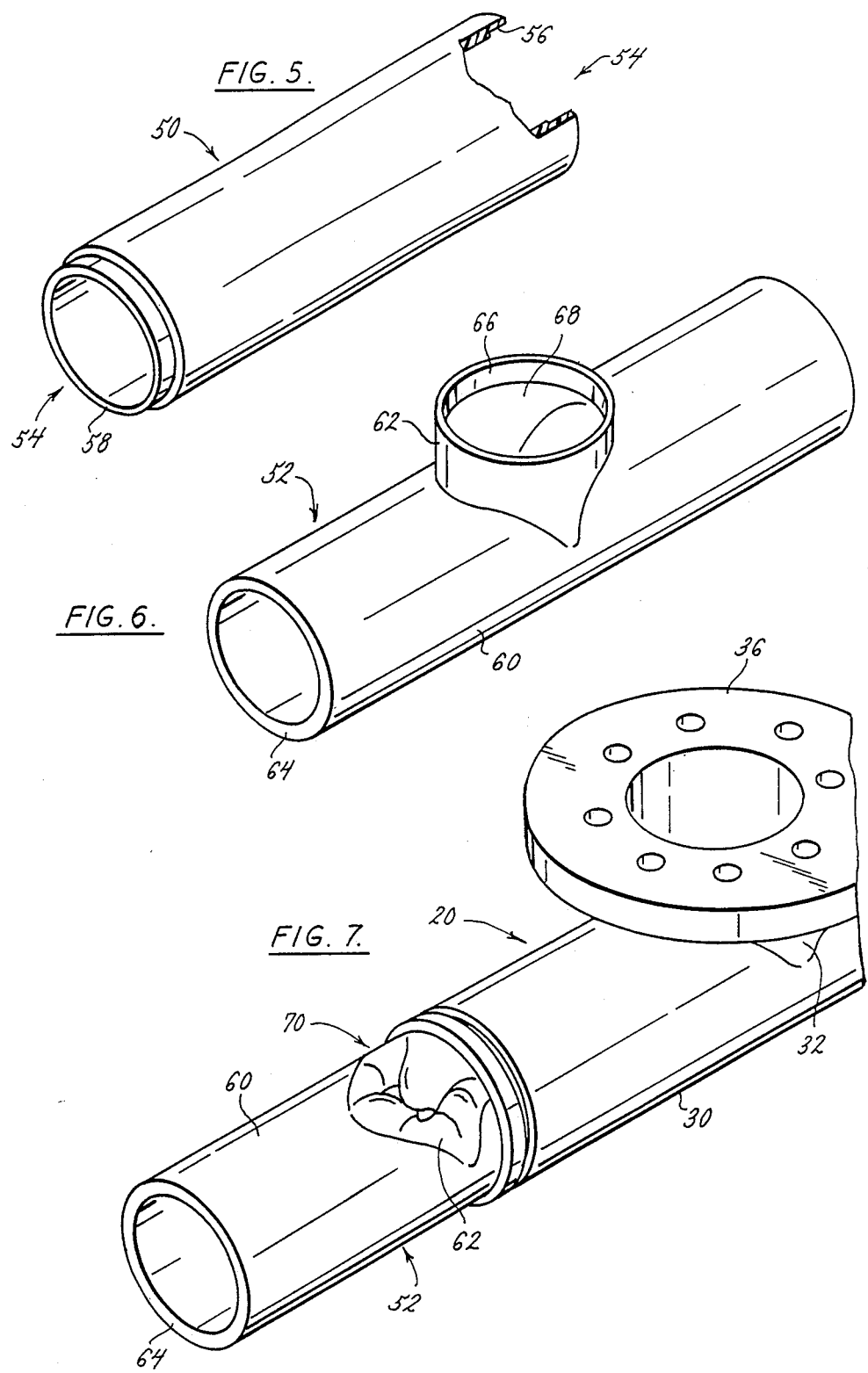

REPLACEABLE PIPE LINER ASSEMBLY

BACKGROUND AND SUMMARY OF THE INVENTION

This invention relates to a pipe liner and more particularly to a replaceable pipe liner assembly of polyurethane or the like for use in lining pipe assemblies for dispensing abrasive materials such as silica sand.

Silica sand for some applications is delivered in hopper trucks that have pipe assemblies at the lower ends of the hoppers for dispensing sand from the truck. These pipe assemblies generally include straight pipe sections joined to T fittings whereby the sand in the hoppers is dispensed from the lower ends of the hoppers, through the T fittings, and into the straight pipe sections where it becomes a common flow of material. These straight pipe sections and T fittings are typically of steel or aluminum. Because of the abrasive nature of silica sand, the sand wears the inner surfaces of the pipes and fittings so that after a relatively short period of time they must be replaced. This is both expensive and places the truck out of service while making the replacements.

It has been known that polyurethane is abrasive resistant, and it has been known to bond polyurethane to the inner surfaces of the T fittings and pipe sections of these pipe assemblies to prolong their life. However, even the bonded polyurethane eventually wears to the point of having to be replaced and this requires either new pipes and fittings with the bonded polyurethane, or returning the worn pipes and fittings to an appropriate facility for rebonding as typically a truck owner would not have the facilities for such a bonding operation. Therefore, even with bonded polyurethane, replacement is relatively expensive and inconvenient.

The present invention overcomes these problems by providing an easily replaceable polyurethane pipe liner assembly which allows the truck owner to replace the liner without replacing the steel or aluminum pipe assembly, at substantially less expense, and without the inconvenience of having to return the truck to a facility for rebonding or replacement.

The replaceable pipe liner assembly of the present invention generally comprises a plurality of tubular polyurethane liner sections positioned in end-to-end abutting contact along the entire length of each straight pipe of the pipe assembly. The outer diameter of each tubular liner section is less than the inner diameter of the pipe to allow ease of insertion of the liner sections into the pipe. Each liner section has means interfitting with an adjacent liner section to axially align the liner sections and present a smooth inner liner wall. The liner sections are slidable within the pipe for insertion of the liner sections into the pipe in interfitting end-to-end engagement.

The invention further comprises a T-shaped liner section for each T fitting of the pipe assembly. The T-shaped liner section has a main tubular portion with an outer diameter less than the inner diameter of the main pipe portion of the T fitting, and a second tubular portion intersecting the main tubular portion with an outer diameter less than the inner diameter of the angled portion of the T fitting. Like the tubular liner sections, the T-shaped liner sections are of molded polyurethane, one-piece, construction. The second tubular portion of the T-shaped liner is foldable inwardly substantially within the main tubular portion for insertion of the T-shaped liner into the fitting and is resilient to release back to its original shape when no longer restrained, as when the T-shaped liner is positioned within the T-fitting with the second tubular portion aligned with the right angle portion of the T-fitting such that it releases from its folded configuration into the right angle portion of the T-fitting. The main tubular portion of the T-shaped liner is in end-to-end engagement with, and is of the same inside diameter as, adjacent tubular liner sections.

Hence, in accordance with the present invention a liner assembly is provided that is easily replaceable so that there is no need to replace parts or all of the pipe assembly itself. Another advantage of the invention is that the liner assembly can be used with pipe assemblies that are already worn, as well as new ones, so long as the worn parts have sufficient structural integrity to support the liner sections.

These and other advantages and features of the invention are apparent from the drawing and detailed description to follow.

DESCRIPTION OF THE DRAWINGS

FIG. 5 is a perspective view with a portion broken away of a tubular liner section in accordance with the present invention.

FIG. 6 is a perspective view of a T-shaped liner section in accordance with the present invention.

FIG. 7 is a perspective view of a T fitting and T-shaped liner section with a portion of the liner section folded inwardly for insertion of the T-shaped liner section into the T fitting.

DETAILED DESCRIPTION OF THE INVENTION

Figure 1:
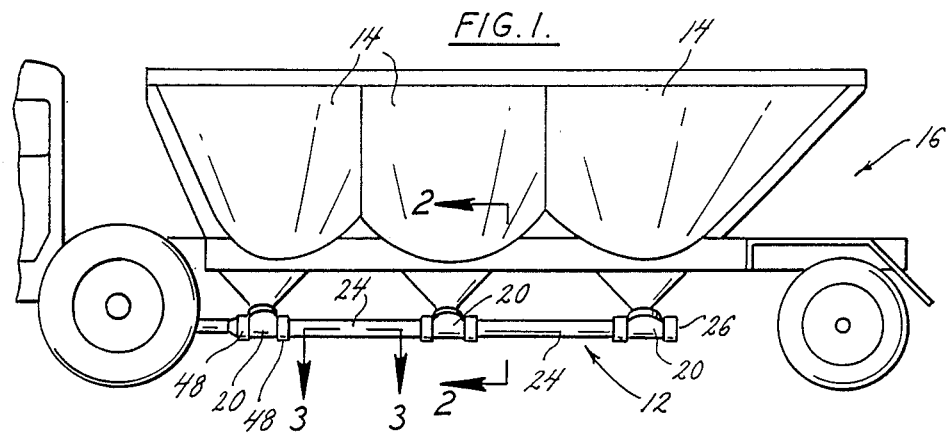
FIG. 1 is a side elevation view of a typical hopper truck having a pipe assembly at the bottom thereof in which the liner assembly of the present invention is used.
Figure 2:
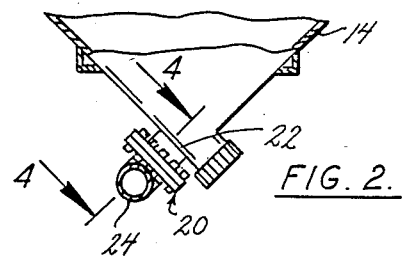
FIG. 2 is a view in section taken generally along the line 2—2 of FIG. 1.
Figure 3:
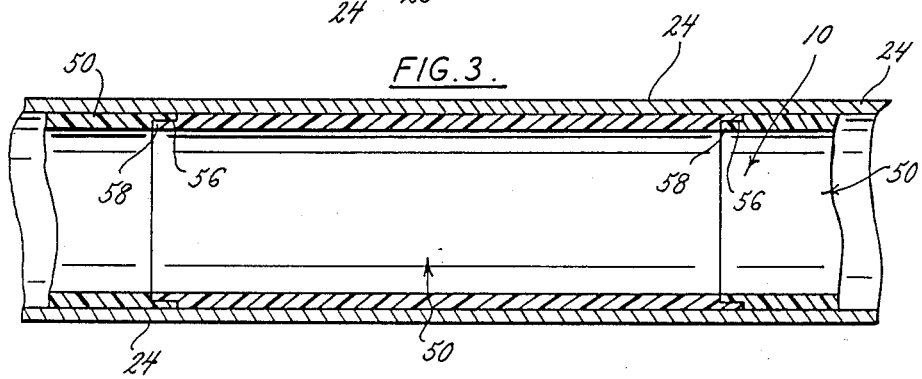
FIG. 3 is a view in section taken generally along the line 3—3 of FIG. 1 and showing a portion of the liner assembly of the present invention within a straight pipe section of the pipe assembly.

Referring to the drawing there is shown a replaceable pipe liner assembly 10 of the present invention for use in a pipe assembly 12 which may be of a type located beneath the hoppers 14 of a hopper truck 16 for transporting and dispensing an abrasive material such as silica sand. Typically such pipe assemblies 12 have T fittings 20 connected to bottom openings 22 at the lower ends of the hoppers. Straight pipe sections 24 are connected between the T fittings such that the abrasive material may be dispensed from a common outlet 26.

More particularly, each T fitting has a main pipe portion 30 and a right angle portion 32 communicating with the main pipe portion 30. The right angle portion has an annular flange 34 for mounting the T fitting to a mating annular flange 36 at the lower end of the hopper such as by bolts 38. Both the main pipe portion and the right angle portion are circular in cross-section. The ends of the main pipe portion may be square presenting flat annular end surfaces 40.

The straight pipe sections 24 are circular in cross-section and are also squared at their ends to present flat annular end surfaces 42 that abut the end surfaces 40 of the T fitting. The main pipe portion of the T fitting and the straight pipe sections are generally of the same inner and outer diameters and are connected end-to-end in axial alignment by the use of band clamps 48.

The T fittings and straight pipe sections are typically steel or aluminum and are well known in the art as are the bands 48 for connecting them and the hopper truck 16 with which they are used.

The replaceable liner assembly 10 includes tubular liner sections 50 for lining the straight pipe sections 24, and T-shaped sections 52 for lining the T fittings 20. Each tubular liner section 50 is circular in cross-section and has means 54 at its end for interfitting with adjacent tubular liner sections. More specifically, one end of the tubular liner section has an inner annular recess 56, and its other end has an annular tongue 58. The annular tongues and recesses are such that the tongue of one section fits within the recess of an adjacent section such that sections placed in end-to-end engagement interfit with each other to axially align the sections and present a smooth inner surface within the liner for the unobstructed flow of the material therethrough. Each tubular liner section 50 is of molded polyurethane or other suitable material and of one-piece construction, and its outer diameter is sufficiently less than the inner diameter of a straight pipe section 24 that the liner section slides easily into the pipe.

The T-shaped liner section 52 has a main tubular portion 60 that is circular in cross-section and fits within the main pipe portion 30 of the T fitting, and has a second tubular portion 62 at right angles to and which communicates with the main tubular portion 60 and that fits within the right angle portion 32 of the T fitting. The second tubular portion 62 is also circular in cross-section. The ends of the main tubular portion 60 may have interfitting means such as 54, or may be squared to present flat end surfaces 64 that generally align with the flat end surfaces 40 of the T fitting. The inner wall of the second tubular portion 62 has a taper 66 at the inlet opening 68 such that the wall of the second tubular portion becomes narrower toward the inlet to facilitate the smooth and unobstructed entry of the abrasive material through the inlet opening.

Figure 4:
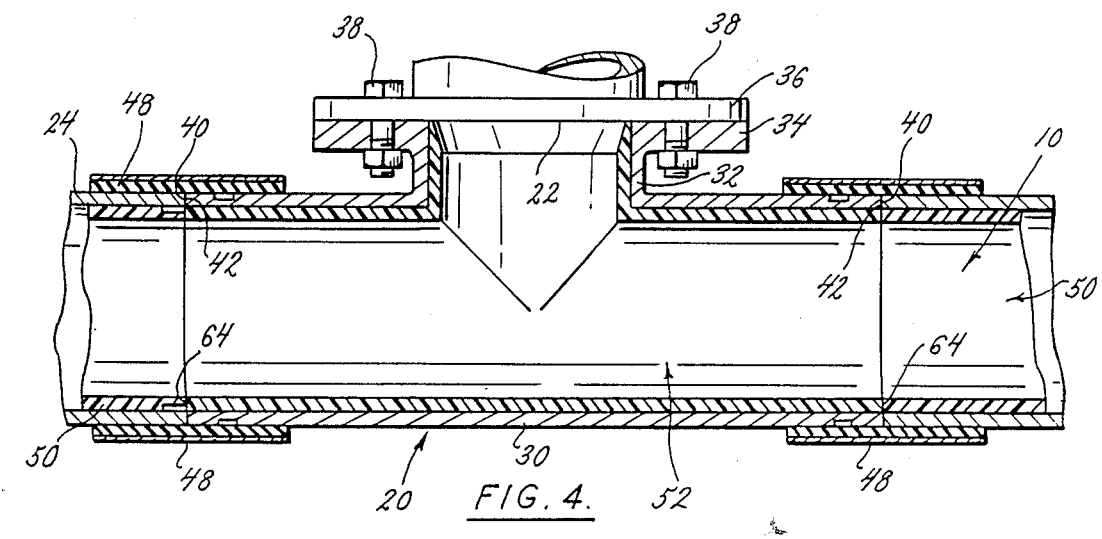
FIG. 4 is a view in section taken generally along the line 4—4 of FIG. 2 and showing a T-shaped liner section of the present invention used with a T fitting of the pipe assembly.

The outer diameters of the main tubular portion 60 and second tubular portion 62 are sufficiently less than the inner diameters of the main pipe portion 30 and right angle portion 32, respectively, such that the T-shaped liner fits loosely within the T fitting and may be inserted therein. The entire T-shaped liner is of molded polyurethane or other suitable material and of one-piece construction. The second tubular portion 62 folds inwardly within the main tubular portion as shown generally at 70 in FIG. 7 so that the T-shaped liner may be inserted through an end of the main pipe portion until the second tubular portion of the liner is aligned with the right angle portion of the T fitting, whereupon the second tubular portion is allowed to release to its normal configuration due to the resiliency of the polyurethane material as shown in FIG. 4.

To line the pipe assembly 12 with the liner assembly 10 of the present invention, at least one end of each straight pipe section 24 is disconnected by loosening and sliding the bands 48 in order to gain access to one end of each T fitting and one end of each pipe section. With one end of each pipe section disconnected, the T-shaped liners are inserted into the T fittings as previously described. Each pipe section 24 is lined by placing a tubular liner section partway into the open end of the pipe, then placing a second tubular liner section in end-to-end interfitting engagement with the first and inserting the first liner section and part of the second into the pipe. Then a third liner section is interfitted with the second in the same manner, and so on until the lead end of the first liner section engages the T-shaped liner. When this occurs the last tubular liner section will probably extend beyond the open end of the pipe. This last liner section is cut off flush with the end of the pipe and the pipe reconnected to the T fitting with the band 48. The lead end of the first tubular liner section may be cut off square, or the lead end may be the tongue end as shown at the left of FIG. 4. Either way, a smooth inner wall is presented for the flow of material.

Hence the liner assembly of this invention lines the entire pipe assembly with a durable, abrasive-resistant plastic liner that is easily replaceable and which protects the pipe assembly itself from costly wear.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A replaceable pipe liner assembly for lining a pipe assembly having pipes for dispensing an abrasive material, wherein the pipes connect to T fittings, each T fitting having a main pipe portion and an angle portion, said pipe liner assembly comprising: a plurality of tubular plastic liner sections positioned in end-to-end contact, the outer diameters of said liner sections being less than the inner diameter of the pipe to allow ease of insertion of the liner sections into the pipe, each liner section having means interfitting with an adjacent liner section to axially align the liner sections and present a smooth liner wall, the liner sections being slidable within said pipe for insertion of the liner sections into said pipe with the liner sections in interfitting end-to-end engagement; a replaceable T-shaped liner section for each T fitting, each T-shaped liner section having a main tubular portion with an outer diameter less than the inner diameter of the main pipe portion of the T fitting and a second tubular portion intersecting said main tubular portion, said second tubular portion having an outer diameter less than the inner diameter of the angle portion of said T fitting, said entire T-shaped liner being of molded plastic, one-piece construction, and said second tubular portion being foldable inwardly substantially within said main tubular portion for insertion of said T-shaped liner into the T fitting and being resilient to release back to its original shape when no longer restrained as when the T-shaped liner is positioned within said T fitting such that the second tubular portion is aligned with the angle portion if the T fitting, the main tubular portion of said T-shaped liner being in end-to-end engagement with, and of the same inside diameter as, adjacent tubular liner sections.

2. The pipe liner assembly of claim 1 wherein a tubular liner section has an annular tongue at one end thereof, and an adjacent tubular liner section has an annular recess at one end thereof for receiving said tongue in interfitting engagement to axially align said liner sections.

3. The pipe liner assembly of claim 1 wherein the second tubular portion has an inlet opening, and the inner wall of the second tubular portion is tapered such that the wall of the second tubular portion narrows toward the inlet opening to facilitate entry of the abrasive material through the opening.

4. In a pipe assembly for dispensing an abrasive material, a replaceable pipe liner comprising: a tubular liner section adapted to fit within a pipe, the outer diameter of said liner section being less than the inner diameter of the pipe to allow ease of insertion of the liner section into the pipe, the liner section having means at each of its ends for interfitting with an adjacent identical liner section to axially align the liner sections and present a smooth inner liner wall, the liner section being slidable within said pipe for insertion of the liner section into said pipe to interfit in end-to-end engagement with an adjacent liner section, the entire liner section being molded plastic, one-piece, construction; a replaceable T-shaped liner section adapted to fit within a T fitting having a main pipe portion and an angle portion, each T-shaped liner section having a main tubular portion with an outer diameter less than the inner diameter of the main pipe portion of the T fitting and a second tubular portion intersecting said main tubular portion, said second tubular portion having an outer diameter less than the inner diameter of the angle portion of said T fitting, said entire T-shaped liner being of molded plastic, one-piece construction, and said second tubular portion being foldable inwardly substantially within said main tubular portion for insertion of said T-shaped liner into the T fitting and being resilient to release back to its original shape when no longer restrained as when the T-shaped liner is positioned within said T fitting such that the second tubular portion is aligned with the angle portion of the T fitting, the main tubular portion of said T-shaped liner being in end-to-end engagement with, and of the same inside diameter as, adjacent tubular liner sections.

5. The pipe liner of claim 4 wherein said liner section has an annular tongue at one end thereof and an annular recess at the other end, the annular tongue adapted for insertion into a like recess of a like adjacent pipe section, and said annular recess adapted to receive a like annular tongue of a like adjacent pipe section.

6. In a pipe assembly for dispensing an abrasive material, a replaceable pipe liner comprising a T-shaped liner section for lining a T fitting having a main pipe portion and an angle portion, said T-shaped liner section having a main tubular portion with an outer diameter less than the inner diameter of the main pipe portion of the T fitting and a second tubular portion intersecting said main tubular portion, said second tubular portion having an outer diameter less than the inner diameter of the angle portion of said T fitting, said entire T-shaped liner section being of molded plastic, one-piece, construction, and said second tubular portion being foldable inwardly substantially within said main tubular portion for insertion of said T-shaped liner section into the T fitting and being resilient to release back to its original shape when no longer restrained as when the T-shaped liner section is positioned within said T fitting such that the second tubular portion is aligned with the angle portion of the T fitting.

7. The T-shaped liner section of claim 6 wherein the second tubular portion has an inlet opening, and the inner wall of the second tubular portion is tapered such that the wall of the second tubular portion narrows toward the inlet opening to facilitate entry of the abrasive material through the opening.

8. A pipe assembly for dispensing abrasive materials comprising:
straight pipe sections and T fittings, means for connecting said straight pipe sections and T fittings to form a continuous pipe assembly for feeding abrasive material therethrough, a plurality of replaceable tubular liner sections positioned in end-to-end contact along the entire length of each straight pipe section, the outer diameter of each liner section being less than the inner diameter of the straight pipe section to allow ease of insertion of the liner sections into the pipe section, each liner section having means interfitting with an adjacent liner section to axially align the liner sections and present a smooth inner liner wall, the liner sections being slidable with said straight pipe sections for insertion of the liner sections into the straight pipe sections with the liner sections in interfitting end-to-end engagement, each T fitting having a main pipe portion and an angle portion, a replaceable T-shaped liner section in each T fitting, each T-shaped liner section having a main tubular portion with an outer diameter less than the inner diameter of the main pipe portion of the T fitting and a second tubular portion intersecting said main tubular portion, said second tubular portion having an outer diameter less than the inner diameter of the angle portion of said T fitting, said entire T-shaped liner and each tubular liner section being of molded plastic, one-piece, construction, said second tubular portion being foldable inwardly substantially within said main tubular portion for insertion of said T-shaped liner into the T fitting and being resilient to release back to its original shape when no longer restrained as when the T-shaped liner is positioned within said T fitting such that the second tubular portion is aligned with the angle portion of the T fitting, the main tubular portion of said T-shaped liner being in end-to-end engagement with, and of the same inside diameter as, adjacent tubular liner sections.

9. The pipe assembly of claim 8 wherein a tubular liner section has an annular tongue at one end thereof, and an adjacent tubular liner section has an annular recess at one end thereof for receiving said tongue in interfitting engagement to axially align said liner sections.

10. The pipe assembly of claim 9 wherein the second tubular portion has an inlet opening, and the inner wall of the second tubular portion is tapered such that the wall of the second tubular portion narrows toward the inlet opening to facilitate entry of the abrasive material through the opening.

11. A method of lining a pipe assembly having pipe sections and fittings connected together for the dispensing of abrasive materials therethrough, wherein said pipe fittings include T fittings each having a main pipe portion and an angle portion, said method comprising the steps of:
inserting into an end of each pipe section a series of tubular liner section, each liner section having an outer diameter less than the inner diameter of the pipe section to allow ease of insertion of the liner sections into the pipe section, each liner section having means interfitting with an adjacent liner section to axially align the liner sections and present a smooth inner liner wall, each liner section being of molded plastic, one-piece construction;

inserting a T-shaped liner into each T fitting, the T-shaped liner having a main tubular portion with an outer diameter less than the inner diameter of the main pipe portion of the T fitting and a second tubular portion intersection said main tubular portion, said second tubular portion having an outer diameter less than the inner diameter of the angle portion of said T fitting said T-shad liner being of molded plastic, one-piece, construction; and positioning the T-shaped liner within the T fitting with the main tubular portion of the liner within the main pipe portion of the T fitting, with the ends of the main tubular portion in end-to-end engagement with adjacent tubular liner sections, and with the second tubular portion of the liner in the angle portion of the T fitting.

12. The method of claim 11 wherein said second tubular portion is foldable inwardly substantially within said main tubular portion, said method further comprising the steps of:

folding said second tubular portion inwardly substantially within said main tubular portion;

inserting the main tubular portion, with the second tubular portion folded inwardly, into the main pipe portion of the T fitting; and positioning the second tubular portion of the liner in alignment with the angle portion of the T fitting allowing the second tubular portion to release from its folded configuration into its original T-shaped configuration with the second tubular portion of the liner inside the angle portion of the T fitting.

13. The method of claim 11 further comprising the step of cutting an end most liner section if necessary to provide an outer liner end that is flush with the end of the pipe section.

14. The method of claim 11 further comprising the step of providing each liner section with interfitting means at each end thereof to interfit with like interfitting means at the ends of adjacent liner sections.

15. The method of claim 11 further comprising the step of providing an annular tongue at one end of each liner section and an annular recess at the other end thereof, the tongue adapted to be inserted in a like recess of an adjacent liner section and the recess adapted to receive a like tongue of an adjacent liner section.

* * * * *